(12) United States Patent
Moessle

(10) Patent No.: US 11,874,728 B2
(45) Date of Patent: Jan. 16, 2024

(54) SOFTWARE APPLICATION DIAGNOSTIC AID

(71) Applicant: SAP SE, Walldorf (DE)

(72) Inventor: Tobias Moessle, Langenargen (DE)

(73) Assignee: SAP SE, Walldorf (DE)

( * ) Notice: Subject to any disclaimer, the term of this patent is extended or adjusted under 35 U.S.C. 154(b) by 241 days.

(21) Appl. No.: 16/903,033

(22) Filed: Jun. 16, 2020

(65) Prior Publication Data

US 2021/0390010 A1 Dec. 16, 2021

(51) Int. Cl.
| | |
|---|---|
| *G06F 11/00* | (2006.01) |
| *G06F 11/07* | (2006.01) |
| *G06N 20/00* | (2019.01) |
| *G06F 16/245* | (2019.01) |
| *G06F 16/242* | (2019.01) |
| *G06N 5/04* | (2023.01) |
| *G06F 11/22* | (2006.01) |

(52) U.S. Cl.
CPC ........ *G06F 11/079* (2013.01); *G06F 11/0709* (2013.01); *G06F 11/0751* (2013.01); *G06F 11/0769* (2013.01); *G06F 11/0787* (2013.01); *G06F 11/2257* (2013.01); *G06F 11/2263* (2013.01); *G06F 16/242* (2019.01); *G06F 16/245* (2019.01); *G06N 5/04* (2013.01); *G06N 20/00* (2019.01)

(58) Field of Classification Search
CPC .............. G06F 11/079; G06F 11/0751; G06F 11/0787; G06F 16/2379; G06F 16/242; G06F 16/245; G06F 11/0703; G06F 11/0706; G06F 11/0709; G06F 11/0769; G06F 11/2252; G06F 11/2257; G06F 11/2263; G06F 11/321; G06F 11/327; G06N 5/01; G06N 5/04; G06N 20/00
See application file for complete search history.

(56) References Cited

U.S. PATENT DOCUMENTS

| | | | |
|---|---|---|---|
| 7,430,598 B2 * | 9/2008 | Raden ................. | H04L 43/0817 707/999.005 |
| 8,234,633 B2 * | 7/2012 | Schneider ........... | G06F 11/2294 717/129 |
| 9,274,874 B1 * | 3/2016 | Chamness ............... | H04L 41/06 |

(Continued)

*Primary Examiner* — Anthony J Amoroso
(74) *Attorney, Agent, or Firm* — Fountainhead Law Group P.C.

(57) ABSTRACT

A diagnostics tool aids in the efficient collection of relevant error data for addressing faults in connected software systems. Context information is collected from a software system that is being displayed. Configuration of the software system is collected, and used to identify relevant connected software systems. Error data is collected via respective log interfaces from the error logs of the software system being displayed, and relevant connected systems. The context, configuration, and error data is stored in a database. Based at least upon the configuration information, a query is formulated and posed to the database. A corresponding query result is received and processed to return an error report to a user interface, for inspection (e.g., by a user or a support staff member). Certain embodiments may further generate an appropriate recommendation based upon the query result. The recommendation may be generated with reference to a stored ruleset and/or artificial intelligence.

20 Claims, 10 Drawing Sheets

(56) References Cited

U.S. PATENT DOCUMENTS

| | | | | |
|---|---|---|---|---|
| 10,031,830 | B2* | 7/2018 | Brodsky | G06F 16/217 |
| 10,402,255 | B1* | 9/2019 | Niyogi | G06F 11/079 |
| 10,540,223 | B1* | 1/2020 | Johansson | G06F 11/0775 |
| 10,868,711 | B2* | 12/2020 | Chor | H04L 41/14 |
| 10,887,157 | B1* | 1/2021 | Fletcher | H04L 41/0622 |
| 10,999,164 | B1* | 5/2021 | Sridhar | H04L 12/4633 |
| 11,061,548 | B1* | 7/2021 | Catakli | H04L 67/75 |
| 11,113,294 | B1* | 9/2021 | Bourbie | G06F 16/24568 |
| 11,537,627 | B1* | 12/2022 | Baskaran | G06F 16/248 |
| 11,593,477 | B1* | 2/2023 | Thimmegowda | G06F 21/552 |
| 2003/0033288 | A1* | 2/2003 | Shanahan | G06F 16/3344 |
| 2004/0249914 | A1* | 12/2004 | Flocken | G06F 11/2294 |
| | | | | 714/E11.173 |
| 2016/0335305 | A1* | 11/2016 | Teodorescu | G06F 40/18 |
| 2021/0390010 | A1* | 12/2021 | Moessle | G06F 16/242 |

\* cited by examiner

App Information Overview

OData Service Name: EHHSS_IDENTIFY_RISKS_SRV
BSP Name: ehsrsk_idfs1
Support Component: EHS-SUS-HS
App Title: Identify Risks
App Id: ehs.hs.risk.identifys1
App Version: 7.100.0-SNAPSHOT
App Description: Identify Risks
App Type: UI5
Fiori Id: F2411

ⓘ We have identified problems with this app. In case you also notice problems or functional restrictions in the application, please Download the collected logs for further processing.

FIG. 5

System Information

System: UYT
Client: 920
ODATA Service Active:  ACTIVE
UI5 App ICF node:  ACTIVE
RFC Connection:  OK
OdataResponse:  Sever Error

FIG. 6

Diagnostic Logs

| T... | Date | Time | Context | Error Text | | User | User | | 4/7/2020, 9:29:39 AM |
|---|---|---|---|---|---|---|---|---|---|
| | | | | | | | | | More Info |
| ⓘ | 07.04.2020 | 09:29:26 | SU53 - MOESSLE | Authorization check failed for object S_USER_GRP, field CLASS, value DEVELOPER. Authorization check failed for object S_USER_GRP, field ACTVT, value 02. | | | | | Read more |
| ⓘ | 07.04.2020 | 09:29:26 | SU53 - MOESSLE | Authorization check failed for object S_USER_GRP, field CLASS, value DEVELOPER. Authorization check failed for object S_USER_GRP, field ACTVT, value 02. | | | | | Read more |

FIG. 7

App Diagnostics Extension -beta

- Overview
- ⌄ Front-end server
  - Authorization Errors (0)
  - Error Log (1)
  - Runtime Errors (0)
- ⌄ Back-end (ER1001)
  - Authorization Errors (2)
  - Error Log (0)
  - Runtime Errors (1)

Diagnostic Logs

| T... | Date | Time |
|---|---|---|
| ⓘ | 07.04.2020 | 09:29:26 |
| ⓘ | 07.04.2020 | 09:29:26 |

FIG. 8

SOFTWARE APPLICATION DIAGNOSTIC AID

BACKGROUND

Unless otherwise indicated herein, the approaches described in this section are not prior art to the claims in this application and are not admitted to be prior art by inclusion in this section.

Software programs are evolving to become increasingly complex. One driver of complexity is the expected integration of a software program with various support platforms, and also suites of other related applications. Such complexity can in turn lead to an increased need for diagnostic monitoring in order to quickly detect program faults, and to address those faults rapidly and efficiently.

In such varied software landscapes, the relevant error logs providing details regarding the nature of possible faults, can reside in a variety of locations. This can make it difficult to quickly and effectively diagnose and address problems that arise.

SUMMARY

A diagnostics tool aids in the efficient collection of relevant error data for addressing faults in connected software systems. Context information is collected from a software system that is being displayed. Configuration of the software system is collected, and used to identify relevant connected software systems. Error data is collected via respective log interfaces from the error logs of the software system being displayed, and relevant connected systems. The context, configuration, and error data is stored in a database. Based at least upon the configuration information, a query is formulated and posed to the database. A corresponding query result is received and processed to return an error report to a user interface, for inspection (e.g., by a user or a support staff member). Certain embodiments may further generate an appropriate recommendation based upon the query result. The recommendation may be generated with reference to a stored ruleset and/or artificial intelligence (AI).

The following detailed description and accompanying drawings provide a better understanding of the nature and advantages of various embodiments.

BRIEF DESCRIPTION OF THE DRAWINGS

FIG. 5 shows a simplified application information overview screen according to an embodiment.

FIG. 6 shows a simplified system information overview screen according to the example.

FIG. 7 shows a detailed log view according to the example.

FIG. 8 shows a simplified menu tree according to the example.

DETAILED DESCRIPTION

Described herein are methods and apparatuses implement aids to software diagnostics. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
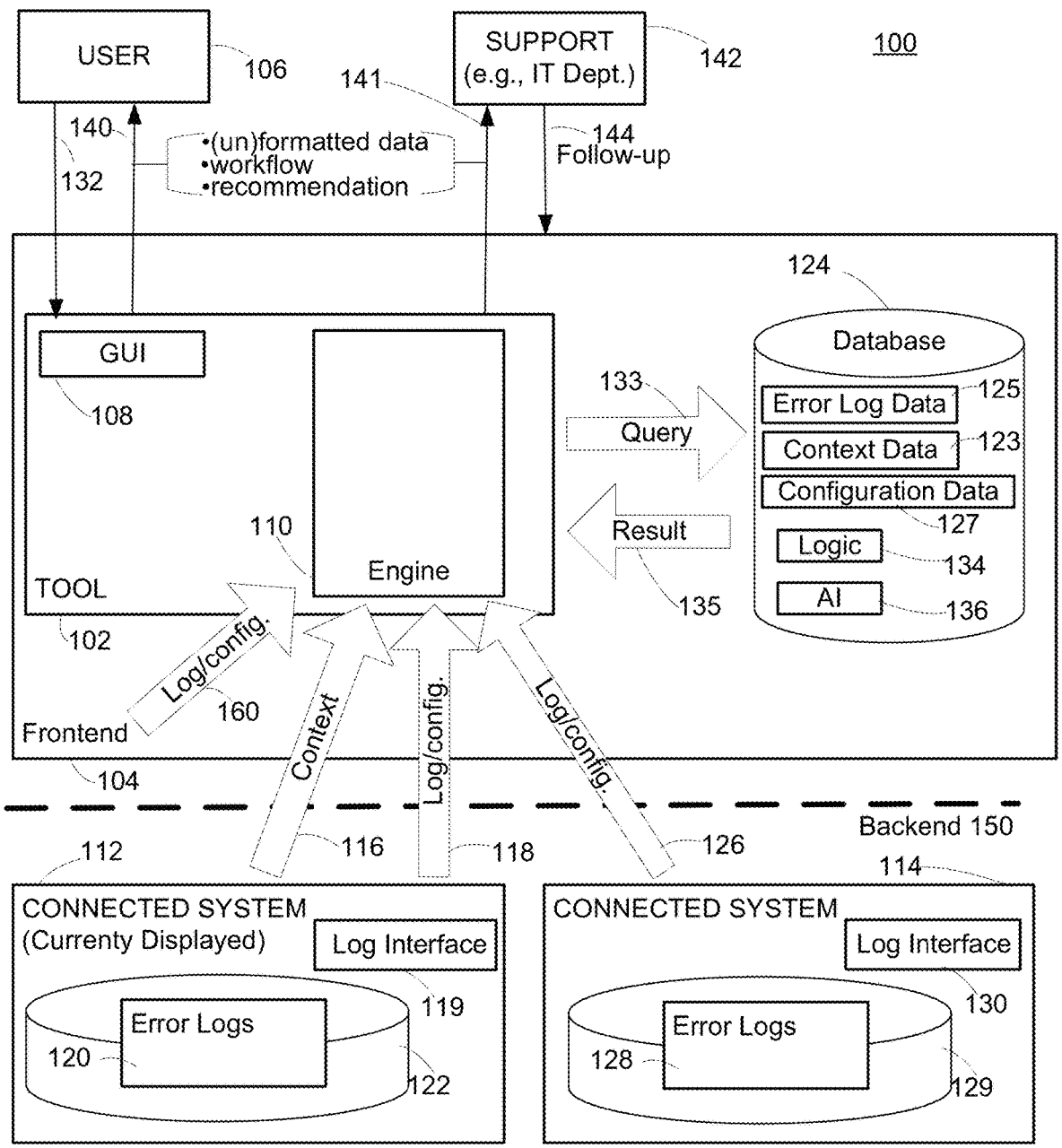
FIG. 1 shows a simplified diagram of a system according to an embodiment.

FIG. 1 shows a simplified view of an example system that is configured to implement software diagnostic assistance according to an embodiment. Specifically, system 100 comprises an application diagnostic tool 102 that is present in a frontend 104 and accessible to a user 106.

The tool includes an interface 108 for communication with the user. The tool further comprises an engine 110 that is configured to receive inputs relating to error diagnostics from a plurality of connected systems 112, 114 located on a backend 150.

In particular, the engine is configured to receive context information 116 relating to the specific connected system 112 that is being displayed. This context information can provide non-error-specific information that can include but is not limited to:
- the name of the displayed connected system,
- the version of the displayed connected system,
- the manner in which the displayed connected system is accessed by the user (e.g., via the frontend),
- installation and/or deployment data,
- patches previously implemented in the displayed connected system.

It is noted that depending upon the particular nature of the application type, relevant information can be collected in a variety of ways. For example, the diagnostics tool could pull context information from an application which is deployed on the frontend system 104.

Under this scenario, the displayed application retrieves its data from one or many connected systems. The diagnostics tool analyzes the settings of the application in regards to data retrieval (on the frontend), and then pulls the logs from the different systems.

Here, without the information from the application settings, the diagnostics tool might not know which particular systems to access. The application itself is deployed on the frontend and therefore part of the frontend system.

For scenarios involving other application types, the architecture depicted in FIG. 1 is also valid. That is, such other application types are implemented in a connected system and only the configuration may be stored on the frontend system. Again, however, for these cases the main context information 116 can also be retrieved from the frontend system.

The engine is also configured to receive from the displayed connected system 112, additional information 118. Such particular, the engine is configured to receive error data, for example as may be collected via a log interface 119 from an error log 120 within a non-transitory computer readable storage medium 122.

The additional information may also comprise configuration data for the displayed connected system. Examples of such configuration data can include but are not limited to:
- connectivity between the displayed connected system and other connected systems with which it is integrated;
- user log data;
- user permissions;

The engine is configured to store the received context data 123, error log data 125, and configuration data 127 within an associated database 124. Then, based upon processing of the context data and the additional data, the engine is configured to collect log/configuration data 126 from the related connected system 114.

This log/configuration data may include information from user and/or error logs 128. This information stored in non-transitory computer readable storage medium 129 of the related connected system, may be accessed via the log interface 130.

It is further noted that the tool may also gather log/configuration data 160 from the frontend itself. This is described further in connection with the specific example below, which utilizes a FIORI launchpad as a central system.

Having collected data relevant to a fault observed in the connected system being displayed, the engine of the diagnostic tool can now take one or more actions. One action is to receive an input 132 from the user.

This input can comprise a request to assemble the collected data relevant to the fault, and communicate that data to the user as an output. Based upon the user input, the engine poses a query 133 to the database.

In response, a query result 135 is returned from the database to the engine. Based upon the query result, the engine provides an output 140 to the user. The output can comprise an error report organized according to a particular structure and comprising context data, configuration data, and/or error log data. Some of the information may be formatted or unformatted in nature.

In addition to (un)formatted data, the output to the user can include a workflow with additional steps, as may be generated by the engine with reference to stored logic 134. In addition to (un)formatted data and a workflow, the output to the user can further include a recommendation for a follow-up action, as may be generated by the engine with reference to stored 134 and/or an artificial intelligence (AI) 136 including a training data corpus.

While FIG. 1 shows the output as being communicated back to the user, the output (or a select portion thereof) 141 can also be communicated by the tool to another party 142 (e.g., IT support staff). That other party may then communicate a further input 144 to instruct follow-up action to the diagnostics tool.

Figure 2:
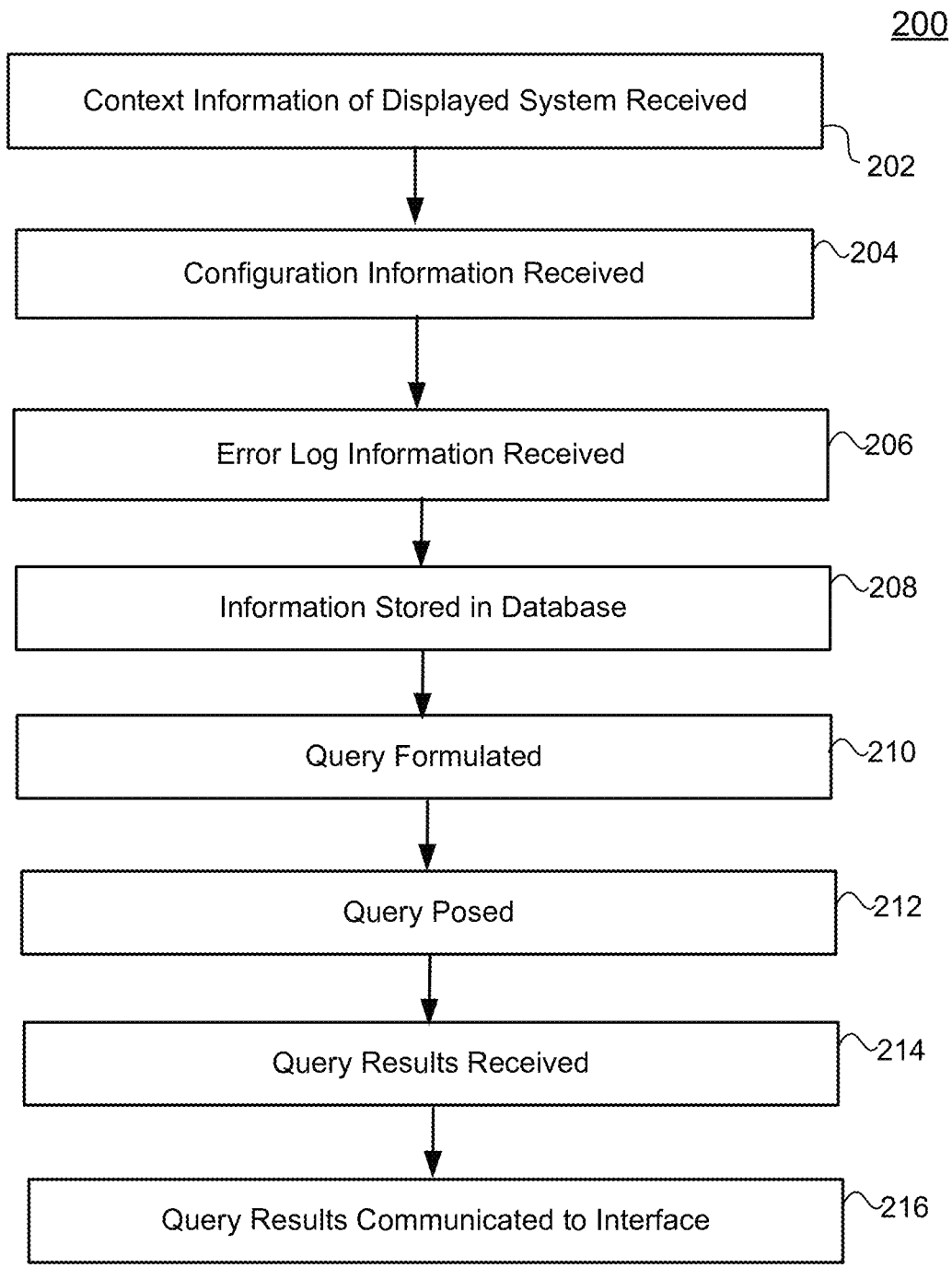
FIG. 2 shows a simplified flow diagram of a method according to an embodiment.

FIG. 2 is a flow diagram of a method 200 according to an embodiment. At 202, a first input is received comprising context information from a first system that is being displayed;

At 204, a second input is received comprising configuration information from the first system. At 206, a third input is received via a log interface, the third input comprising error information from an error log of the first system.

At 208, the context information, the configuration information, and the error information is stored in a database. At 210, the configuration information is referenced to formulate a query.

At 212, the query is posed to the database. At 214, a query result is received from the database, the query result including the error information from the first system. At 216, the query result is communicated to a user interface.

Embodiments as described herein may offer certain benefits over other approaches. One possible benefit is increased responsiveness to correct possible problems. That is, a user (or other party receiving the diagnostic information communicated by embodiments) is able to look up issues more quickly.

Moreover, the solution will also feel more integrated to a user and to any support staff. This is because embodiments display errors directly where they are needed for analysis. Rather than involving intermediaries, problems can instead be recognized and addressed directly to technical users located at the customer, without having possible time lags or gaps in communication.

Further details regarding the provision of diagnostic assistance according to particular embodiments, are now provided in connection with the following example.

EXAMPLE

The FIORI launchpad available from SAP SE of Walldorf, Germany, serves as a central platform for running multiple applications—e.g., Enterprise Resource Planning (ERP) software, Customer Relationship Management (CRM) software, and/or data storage (e.g., S/4HANA).

Conventionally, in the context of applications running on the FIORI launchpad central program, users are forced to retrieve information on error logs from the Frontend or Backend systems directly. However, there may be many systems connected to the Frontend or Gateway server, and as part of a first diagnostic step it may prove difficult to identify the relevant systems involved.

That is, a particular software application which has encountered a problem, might retrieve data from different Backend systems. Therefore, retrieving error logs might turn out to be challenging.

In addition, the retrieval of log information may happen through a different access type (for example an administration console), or via the SAP GUI. Then, even once the relevant systems have been identified, there are still several different locations which may need to be checked for logs.

For example, within the SAP environment, such locations could be for example the following transactions:
/IWEND/ERROR_LOG
/IWBEP/ERROR_LOG
SU53
ST22

Moreover, conventional troubleshooting may involve checking not only log information, but also some basic configuration settings. These basic configuration settings may be checked in order to determine issues such as:
has the software application been deployed correctly?
is the software application present in the right version?

Within the SAP environment, such checking of basic configuration settings can be accomplished via transaction codes, examples of which are given below.
SICF: Services active
/IWFND/MAINT_SERVICE: Service mapping active
/UI2/FLPD_CONF: Target mapping, URL Parameters
MM_APP: Intend based navigation Under some circumstances, potential problems can be identified by the user who is experiencing the problem. An example of this is when the user identifies a missing authorization.

Usually, however, the user is not able to solve this issue alone. Rather, the user requires assistance by someone else (e.g., IT support).

In order to effectively pass context information to the next person, conventionally the user might need to engage in a whole series of manual steps. This can include taking screenshots of the error logs, because not all applications provide log download functionality.

Another manual step may be to initiate follow-up actions based upon the diagnostic information. This is because it may also not be possible to trigger follow up actions directly from the error logs themselves.

Accordingly, embodiments offer a tool that allows diagnostic information to be collected and displayed in a central location. The tool receives the context of the software application currently being displayed, and requests information concerning that application from participating systems. The tool may also display configuration errors and context information (e.g., related patches of the software application and/or configuration issues on a frontend server).

Figure 3:
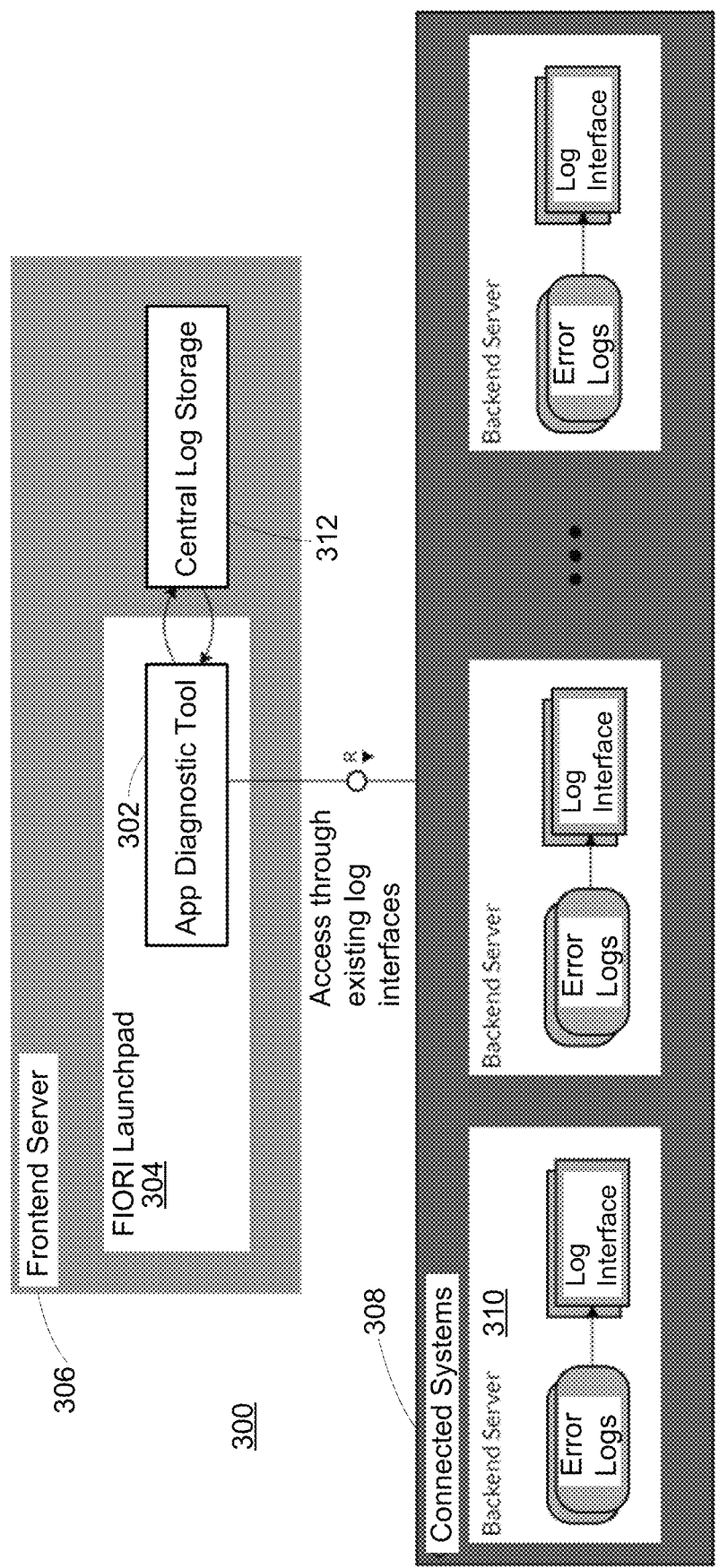
FIG. 3 depicts a simplified landscape according to an example.

FIG. 3 shows a simplified view of a design of a landscape 300 according to an embodiment. Here, the diagnostic tool 302 is present within the FIORI launchpad 304 of a frontend server 306.

That frontend server is in communication with a plurality of connected systems 308 through respective backend servers 310. The connected systems include error logs and a log interface. The diagnostic tool communicates with a central log storage 312 in the frontend server.

The error logs may be aggregated and possibly stored on the central system for further processing. Harmonizing the log structure can also allow data mining tools to later analyze the logs and derive measures as follow up.

The embodiment of the diagnostic tool according to this embodiment may provide a recommendation for follow up activities based upon the findings in the logs. Through a rule-based logic or with the help of an artificial intelligence, proposals can be generated based on the combination of the logged insights. In an example, such a proposal could indicate that the user is not mapped correctly on the backend system, and requires changes through identity management.

Utilizing a diagnostic tool according to an embodiment, user who has identified an issue may be able to take one or more of the following actions.

Store the found errors on the frontend server to make them available afterwards. In case the logs are stored, a link should be generated for a person to later identify the stored errors and to look for a solution.

Download the errors as excel sheet to send them to a user administrator or technical consultant.

Create a work item and start a workflow for a technical user or administrator to fix the issue.

Create a ticket for a ticketing system with the relevant logs attached.

For certain logs it may be possible to trigger actions based on the concrete error message. This can be done directly for a certain log entry, based on the exact error message. So, in case the error is a known problem, the user can find more information, or possible root causes in this section.

The user analyzing the issue can lookup issues more quickly. In addition to the error logs it is possible to review checks on basic configuration issues that are relevant in the context of the diagnosed application. Examples of common checks can include but are not limited to the following.

Are the relevant data services active and available?

Is the remote system available and the connection properly maintained?

Are common library services active and available?

These checks also lead to follow up activities, where the user is able to fix the configuration issue right away. An example of a follow up activity could be to activate the corresponding data service.

The benefits offered by embodiments can include a higher degree of integration with error diagnosis. This is because errors are displayed directly where they can be treated. Problems can be addressed directly to technical users at a customer, without intervening technology gaps.

Figure 4:
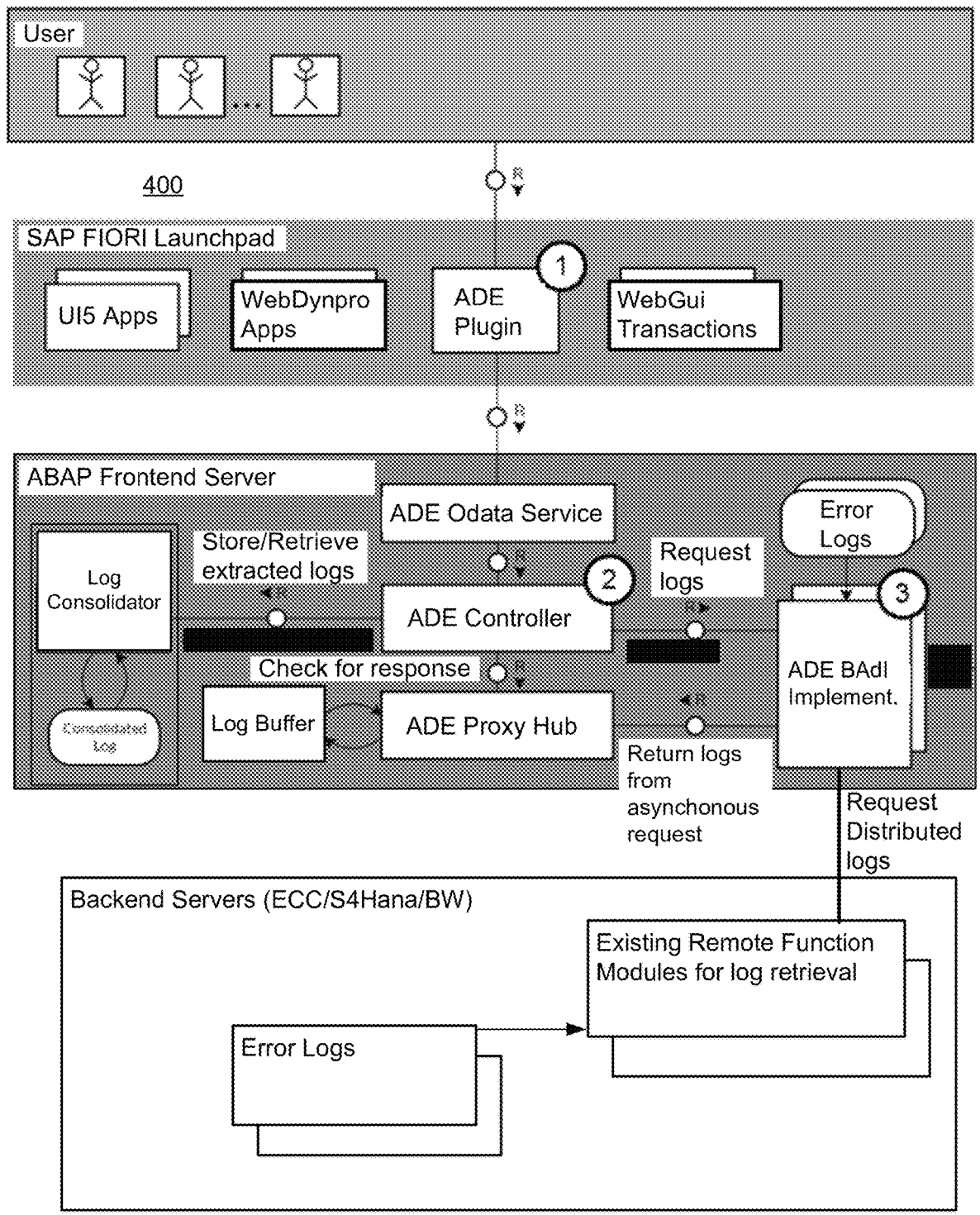
FIG. 4 is a simplified block diagram of an architecture according to an embodiment.

FIG. 4 shows a simplified block diagram of an architecture 400 according to the instant example. As shown in the simplified exemplary architecture of FIG. 4, information relevant to the transactions listed above, are processed in an Application Diagnostics Extension (ADE) Plugin 1. This ADE is a Plugin to the SAP FIORI launchpad.

The plugin to the FIORI launchpad takes the context of the software application that is currently being displayed. Based upon this context, the ADE plug-in requests the relevant log and configuration information concerning that displayed application from the ABAP Frontend Server system (Gateway Foundation).

The frontend server system includes a controller 2. That controller is in communication with ADE SAP Business Add-In (BAdI) implementations 3 within the frontend server.

The BAdI implementations are in turn in communication with one or more backend server systems 308. Examples can include but are not limited to SAP ERP Central Component (ECC), SAP S/4Hana, SAP Business Warehouse (BW), and others.

In particular error and access log(s) are stored in the backend server system. Those logs are read by the ADE and used to provide assistance in diagnosis and curing of faults in the software program.

Specific details regarding the ADE Plugin component 1 of FIG. 4 according to this example, are now provided. It is noted that in this particular example, the App Diagnostic Tool is embedded as plugin in the FIORI launchpad.

While other than plugin configurations are possible, these could lead to more delivery and configuration effort. This plugin approach also makes sense because the diagnostic tool requires information from the launchpad itself, in order to determine which application is currently being displayed.

Without the context of the currently displayed application, it may be difficult for the diagnostic tool to provide a detailed analysis of the problems. This is because there might be different systems and targets involved.

The diagnostic application according to this specific example, provides the following three (3) different type of views:

Application Information Overview
System Information Overview
Detailed Log View.

FIG. 5 shows a simplified screen for the Application Information Overview. The Application Information Overview may be quickly available when the user clicks on the plugin icon.

The displayed data is pulled from the currently loaded software application and its configuration. The amount of data displayed depends on the application type. For example, WebDynpro and WebGui applications do not provide as much metadata as a SAP UI5 application.

In addition to the overview, a message is displayed when errors have been detected.

FIG. 6 shows a simplified screen for the System Information Overview. The System Information Overview displays the results of configuration checks of the specific system.

These configuration checks are different for each application type and for the different system setups. For example, in a front-end back-end scenario there are two System Information Overviews. In an embedded scenario, there is only one overview.

The configuration checks mainly focus on the configuration required to run the current application, such as active Business Server Pages and oData services. The results of these checks are highlighted and displayed in the overview.

FIG. 7 shows a simplified screen for the Detailed Log View. The detailed log view displays information from logs of participating systems.

The displayed logs are not specific for the application itself, but may be more based upon system, user, and timestamp. The error text is generic and does not contain any specific fields—it is a concatenated version of the text displayed in the backend system.

In addition to the error text, there is a possibility for follow up actions in the log entry. These can be triggered via the More Info link.

Details regarding the ADE controller 2 of FIG. 4 of this particular example, are now described. As the frontend server is a central component, the application service is implemented in the SAP_UI or similar layer.

Otherwise, the service may not be available in a frontend/backend server scenario. Implementing the application services on the backend systems could lead to additional complexity and reduced reliability.

The oData Service for the tool is provided locally on the frontend server and then consumed by the UI5 based plugin. The main interface to the service extension classes is the ADE Controller The ADE Controller handles the requests to the various log and view types. The controller also accesses the app configuration with the provided app key and provides this general information to the SAP BAdIs.

Details regarding the ADE BAdI implementations 3 according to this particular example, are now described. FIG. 8 shows a menu tree with a user interface representation of BAdIs.

In order to provide flexible access to the log and system overview information, the BAdI framework is used. Each BAdI definition is setup for multiple use, so that additional checks and logs can be added later. This concept also allows customers to extend the current scope of logs and checks with their own implementations.

Each implementation represents an entity, which is later displayed on the user interface in the menu tree. Customers do not have to adjust the UI project or the service in order to display their own logs or other details.

Figure 9:
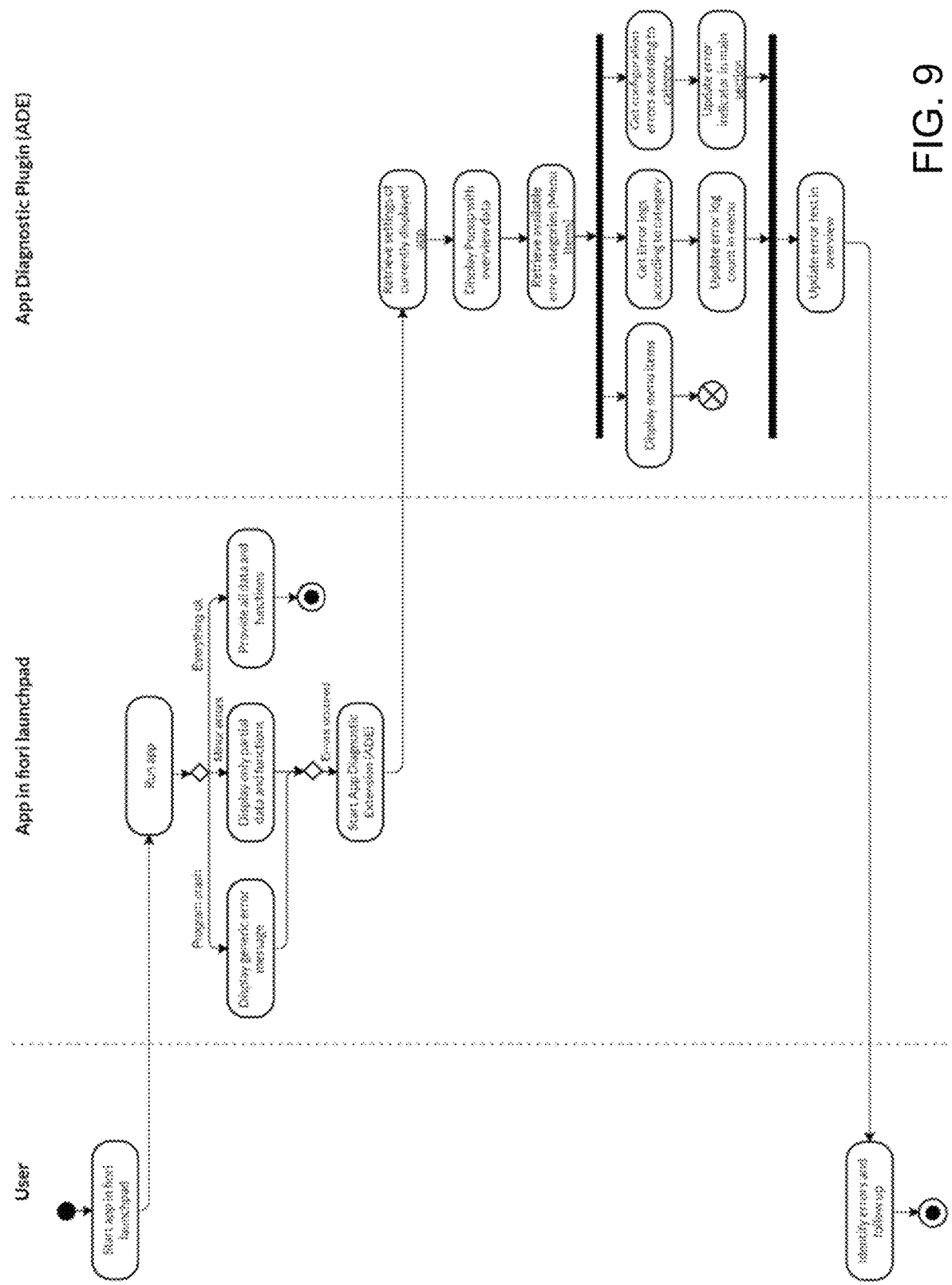
FIG. 9 shows a simplified activity diagram according to the example.

The basic activity sequence according to this example is now described. FIG. 9 shows a simplified activity diagram.

This activity sequence represents the main data retrieval functions of the diagnostic tool. After the data is retrieved, the user has the possibility to either store the logs and configuration issues on the frontend server, or trigger follow up activities where these logs might be attached.

Figure 10:
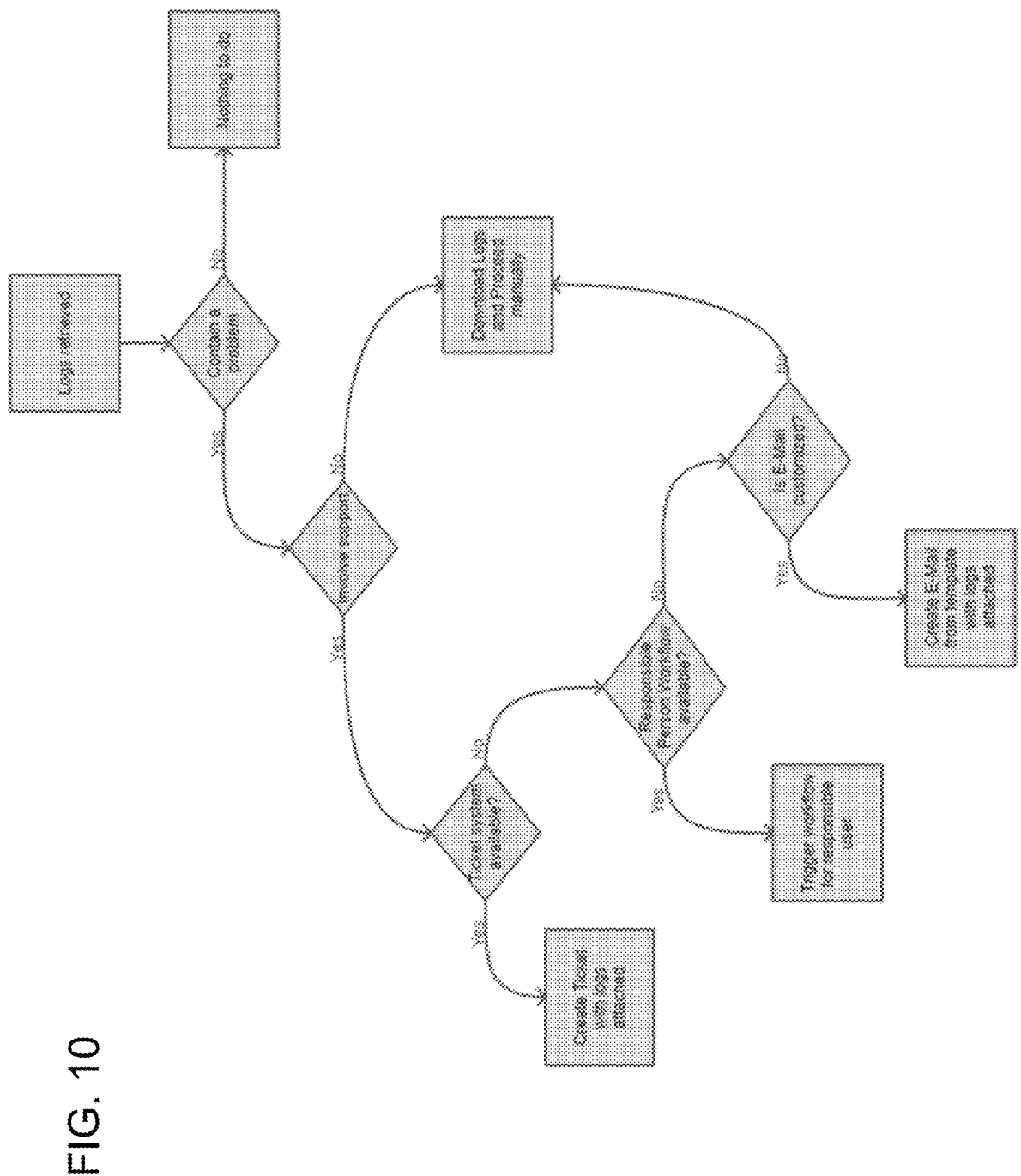
FIG. 10 shows a simplified decision tree according to the example.

As an alternative to the attachment, the logs can be stored on the frontend server and only the access link is shared. It may be possible to start certain actions based on the user's decision and the system setup. FIG. 10 shows this in a simplified decision tree.

Returning now to FIG. 1, there the particular embodiment is depicted with the engine responsible for implementing diagnostic assistance as being located outside of the database. However, this is not required.

Rather, alternative embodiments could leverage the processing power of an in-memory database engine (e.g., the in-memory database engine of the HANA in-memory database available from SAP SE), in order to perform one or more of the various functions described above.

Figure 11:
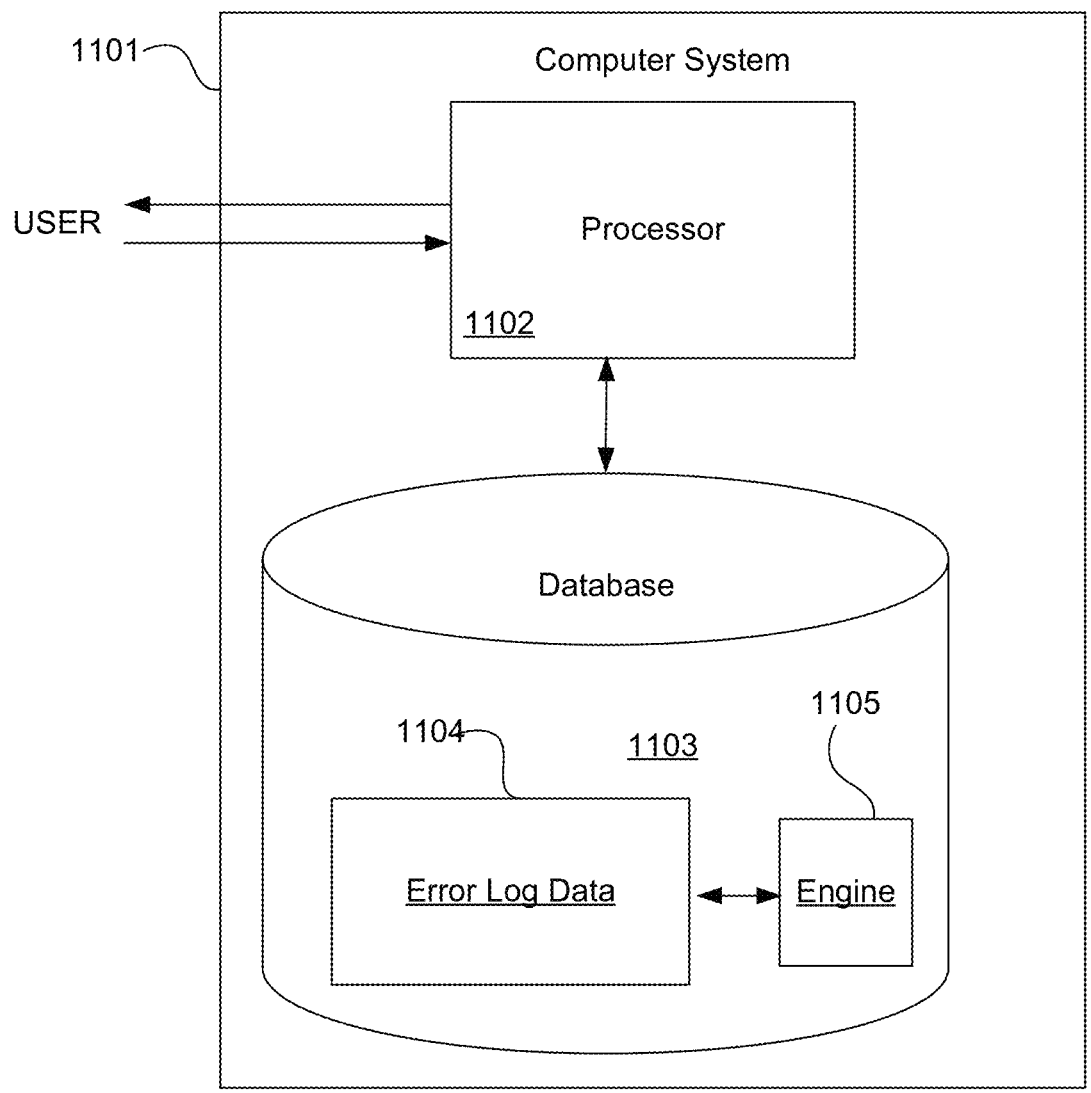
FIG. 11 illustrates hardware of a special purpose computing machine according to an embodiment that is configured to implement diagnostic assistance for a software program.

Thus FIG. 11 illustrates hardware of a special purpose computing machine configured to implement intelligent operation of a cloud system according to an embodiment. In particular, computer system 1101 comprises a processor 1102 that is in electronic communication with a non-transitory computer-readable storage medium comprising a database 1103. This computer-readable storage medium has stored thereon code 1105 corresponding to an engine. Code 1104 corresponds to error log data. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 12:
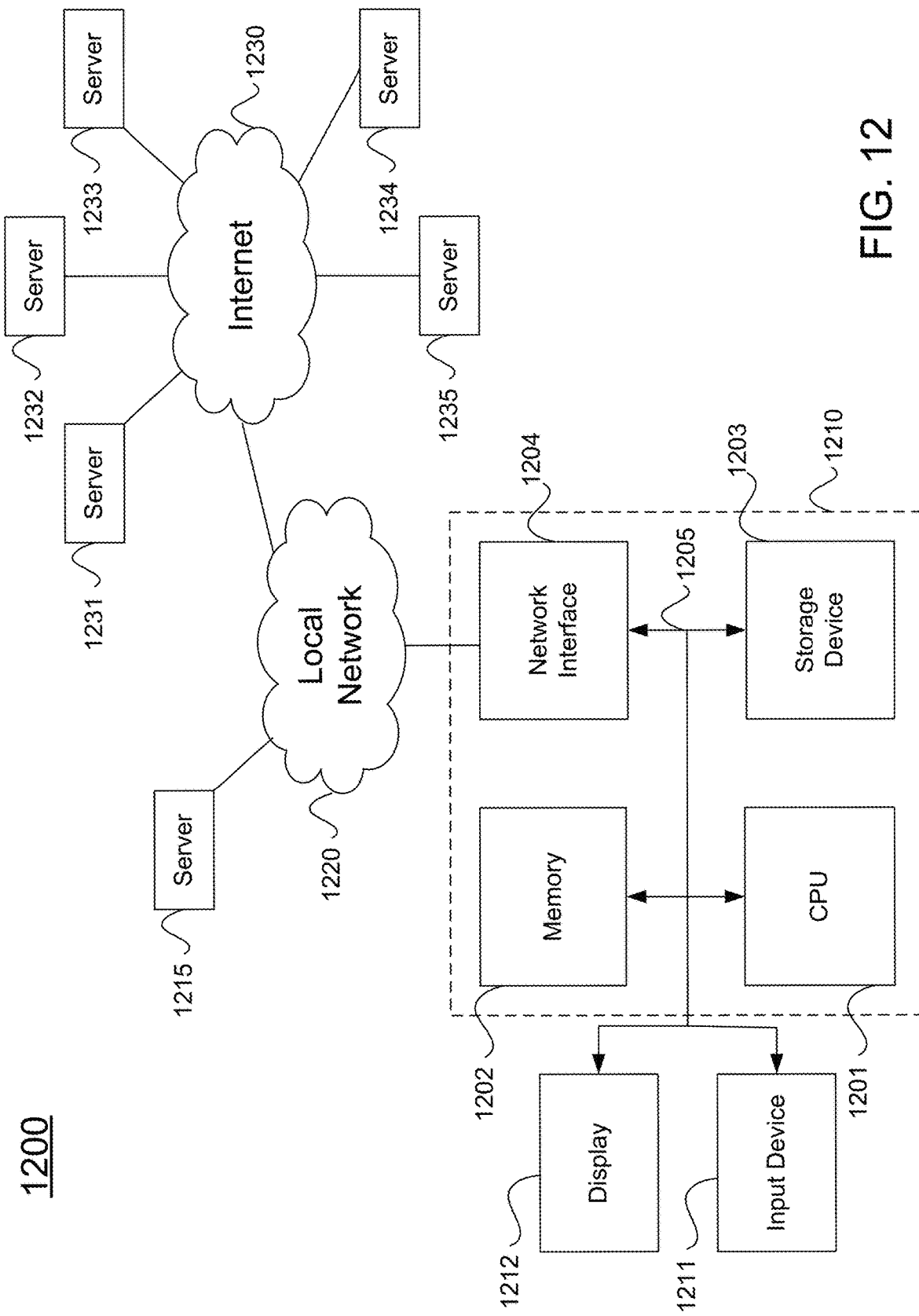
FIG. 12 illustrates an example computer system.

An example computer system 1200 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving, by a frontend server, a first input comprising context information associated with one or more software applications from a first system being currently displayed, wherein the first system comprises one of two or more backend servers;
   receiving, by the frontend server, a second input comprising configuration information from the first system;
   receiving, by the frontend server via a log interface, a third input comprising error information from an error log of the first system;
   determining, by the frontend server from the context information, that a second system is connected to the first system, wherein the context information includes connectivity information that identifies the second system to the frontend server, wherein the second system comprises another of the two or more backend servers, and wherein the second system is not currently displayed;
   receiving, by the frontend server, a fourth input comprising error information from an error log of the second system;
   storing the context information, the configuration information, the error information from the first system, and the error information from the second system, in a database implemented by the frontend server;
   referencing, by the frontend server, the configuration information to formulate a query;
   posing the query to the database;
   receiving a query result from the database, the query result including the error information from the first system and the error information from the second system;
   communicating the query result to a user interface, wherein the frontend server hosts the user interface and the database and wherein the user interface is in a central location;
   generating, by a trained artificial intelligence or a ruleset implemented by the frontend server, a recommendation for a follow-up action from the query result based on the stored context information;
   communicating the recommendation to the user interface;
   receiving an additional input from a user via the user interface accepting the recommendation and instructing the follow-up action; and
   implementing, by the frontend server, a data service corresponding to the follow-up action instructed by the additional input from the user,
   wherein the frontend server implements an applications diagnostic extension (ADE) controller and an applications diagnostic extension (ADE) business add-in (BAdI) implementation, wherein receiving the error information from the error log of the second system comprises:
   requesting, by the ADE controller from the ADE BAdI implementation, the error information from the second system as identified by the connectivity information; and
   requesting, by the ADE BAdI implementation from the second system as identified by the connectivity information, the error information from the second system.

2. A method as in claim 1 further comprising:
   generating a workflow from the query result;
   communicating the workflow to the user interface; and
   receiving an additional input generated from the workflow.

3. A method as in claim 1 wherein the configuration information is obtained from a transaction code.

4. A method as in claim 1 wherein:
   the database comprises an in-memory database; and
   the query is formulated by an in-memory database engine of the in-memory database.

5. A method as in claim 1 wherein the recommendation indicates that a user is not mapped correctly.

6. A method as in claim 1 wherein the follow-up action is a change to an identity management.

7. A method as in claim 1, wherein one or more additional systems are connected to the first and second system.

8. A method as in claim 1, wherein the context information comprises non-error-specific information.

9. The method as in claim 1, wherein the frontend server implements an applications diagnostic extension (ADE) proxy hub, wherein the ADE proxy hub is configured to receive the error information from the second system resulting from the request by the ADE BAdI implementation, and wherein the ADE proxy hub is configured to store the error information from the second system in a log buffer.

10. The method as in claim 9, wherein the ADE controller is configured to check for a response from the ADE proxy hub, and wherein the ADE controller is configured to store the error information from the second system in the database in response to the response from the ADE proxy hub.

11. The method as in claim 1, wherein the BAdI implementation is configured to asynchronously request the error information from the second system.

12. The method as in claim 1, wherein the BAdI implementation is configured to asynchronously request the error information from the second system as distributed logs.

13. A non-transitory computer readable storage medium embodying a computer program for performing a method, said method comprising:
receiving, by a frontend server, a first input comprising context information associated with one or more software applications from a first system being currently displayed, wherein the first system comprises one of two or more backend servers;
receiving, by the frontend server, a second input comprising configuration information from the first system;
receiving, by the frontend server via a log interface, a third input comprising error information from an error log of the first system;
determining, by the frontend server from the context information, that a second system is connected to the first system, wherein the context information includes connectivity information that identifies the second system to the frontend server, wherein the second system comprises another of the two or more backend servers, and wherein the second system is not currently displayed;
receiving, by the frontend server, a fourth input comprising error information from an error log of the second system;
storing the context information, the configuration information, the error information from the first system, and the error information from the second system, in a database implemented by the frontend server;
referencing, by the frontend server, the configuration information to formulate a query;
posing the query to the database;
receiving a query result from the database, the query result including the error information from the first system and the error information from the second system;
communicating the query result to a user interface, wherein the frontend server hosts the user interface and the database and wherein the user interface is in a central location;
generating, by a trained artificial intelligence or a ruleset implemented by the frontend server, a recommendation for a follow-up action from the query result based on the stored context information;
communicating the recommendation to the user interface;
receiving an additional input from a user via the user interface accepting the recommendation and instructing the follow-up action; and
implementing, by the frontend server, a data service corresponding to the follow-up action instructed by the additional input from the user,
wherein the frontend server implements an applications diagnostic extension (ADE) controller and an applications diagnostic extension (ADE) business add-in (BAdI) implementation, wherein receiving the error information from the error log of the second system comprises:
requesting, by the ADE controller from the ADE BAdI implementation, the error information from the second system as identified by the connectivity information; and
requesting, by the ADE BAdI implementation from the second system as identified by the connectivity information, the error information from the second system.

14. A non-transitory computer readable storage medium as in claim 13 wherein the method further comprises:
generating a workflow from the query result;
communicating the workflow to the user interface; and
receiving an additional input generated from the workflow.

15. A non-transitory computer readable medium as in claim 13, wherein one or more additional systems are connected to the first and second system.

16. The non-transitory computer readable storage medium as in claim 13, wherein the frontend server implements an applications diagnostic extension (ADE) proxy hub, wherein the ADE proxy hub is configured to receive the error information from the second system resulting from the request by the ADE BAdI implementation, and wherein the ADE proxy hub is configured to store the error information from the second system in a log buffer.

17. A computer system comprising:
one or more processors;
a software program, executable on said computer system, the software program configured to cause an in-memory database engine of an in-memory source database to:
receive, by a frontend server, a first input comprising context information associated with one or more software applications from a first system being currently displayed, wherein the first system comprises one of two or more backend servers;
receive, by the frontend server, a second input comprising configuration information from the first system;
receive, by the frontend server via a log interface, a third input comprising error information from an error log of the first system;
determine, by the frontend server from the context information, that a second system is connected to the first system, wherein the context information includes connectivity information that identifies the second system to the frontend server, wherein the second system comprises another of the two or more backend servers, and wherein the second system is not currently displayed;
receive, by the frontend server, a fourth input comprising error information from an error log of the second system;
store the context information, the configuration information, the error information from the first system, and the error information from the second system, in a database implemented by the frontend server;
reference, by the frontend server, the configuration information to formulate a query;
pose the query to the database;
receive a query result from the database, the query result including the error information from the first system and the error information from the second system;
communicate the query result to a user interface, wherein the frontend server hosts the user interface and the database and wherein the user interface is in a central location;
generate, by a trained artificial intelligence or a ruleset implemented by the frontend server, a recommendation for a follow-up action from the query result based on the stored context information;
communicate the recommendation to the user interface;
receive an additional input from a user via the user interface accepting the recommendation and instructing the follow-up action; and implement, by the frontend server, a data service corresponding to the follow-up action instructed by the additional input from the user,
wherein the frontend server implements an applications diagnostic extension (ADE) controller and an applications diagnostic extension (ADE) business add-in (BAdI) implementation, wherein to receive the error information from the error log of the second system comprises:
  request, by the ADE controller from the ADE BAdI implementation, the error information from the second system as identified by the connectivity information; and
  request, by the ADE BAdI implementation from the second system as identified by the connectivity information, the error information from the second system.

18. A computer system as in claim 17 wherein the in-memory database engine is further configured to:
  generate a workflow from the query result;
  communicate the workflow to the user interface; and
  receive an additional input generated from the workflow.

19. A computer system as in claim 17, wherein one or more additional systems are connected to the first and second system.

20. The computer system as in claim 17, wherein the frontend server implements an applications diagnostic extension (ADE) proxy hub, wherein the ADE proxy hub is configured to receive the error information from the second system resulting from the request by the ADE BAdI implementation, and wherein the ADE proxy hub is configured to store the error information from the second system in a log buffer.

\* \* \* \* \*